(12) United States Patent
Baxter, III (10) Patent No.: US 7,231,492 B2
(45) Date of Patent: Jun. 12, 2007

(54) DATA TRANSFER METHOD WHEREIN A SEQUENCE OF MESSAGES UPDATE TAG STRUCTURES DURING A READ DATA TRANSFER

(75) Inventor: William F. Baxter, III, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 177 days.

(21) Appl. No.: 10/740,219

(22) Filed: Dec. 18, 2003

(65) Prior Publication Data

US 2005/0071424 A1 Mar. 31, 2005

Related U.S. Application Data

(63) Continuation-in-part of application No. 10/675,038, filed on Sep. 30, 2003.

(51) Int. Cl.
G06F 12/00 (2006.01)
G06F 12/16 (2006.01)
G06F 12/08 (2006.01)

(52) U.S. Cl. .................. 711/113; 711/141; 711/130

(58) Field of Classification Search ............ None
See application file for complete search history.

(56) References Cited

U.S. PATENT DOCUMENTS 5,420,983 A 5/1995 Noya et al.
6,052,822 A 4/2000 Kim et al.
2002/0004886 A1* 1/2002 Hagersten et al. .......... 711/141
2002/0083270 A1* 6/2002 Chilton ....................... 711/130

FOREIGN PATENT DOCUMENTS

GB 2 366 425 A 3/2002

* cited by examiner

Primary Examiner—Hyung Sough
Assistant Examiner—Duc T. Doan (57) ABSTRACT

A data storage system wherein a data controlling director examines the contents of the tag to determine whether requested read data exists in a local cache memory having this data controlling director or in some other local memory cache, or in a disk drive coupled to this data controlling director; and if the requested read data does exist in the local cache memory having this data controlling director, or in the disk drive coupled to director; the data controlling director sends a copy to the local cache memory of the read request receiving director; updates its tag to show a shared copy will reside in the requesting director's local cache memory; and also sends a message to the read requesting director indicating the data is available for storage in the local cache memory on said one of the plurality of first director/memory boards having the read request receiving director.

5 Claims, 8 Drawing Sheets

DATA TRANSFER METHOD WHEREIN A SEQUENCE OF MESSAGES UPDATE TAG STRUCTURES DURING A READ DATA TRANSFER

RELATED APPLICATIONS

This is a continuation in part of copending patent application Ser. No. 10/675,038 filed Sep. 30, 2003.

INCORPORATION BY REFERENCE

This patent application incorporates by reference the entire subject matter of copending patent application Ser. No. 10/675,038, filed Sep. 30, 2003, entitled Data Storage System Having Packet Switching Network, inventors, John K. Walton, William F. Baxter III, Kendell A. Chilton, Daniel Castel, Michael Bermingham, and James M. Guyer, assigned to the same assignee as the present invention.

TECHNICAL FIELD

This invention relates generally to data storage systems, and more particularly to data storage systems having redundancy arrangements to protect against total system failure in the event of a failure in a component or subassembly of the storage system.

BACKGROUND

As is known in the art, large host computers and servers (collectively referred to herein as "host computer/servers") require large capacity data storage systems. These large computer/servers generally include data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board. In order to provide data integrity in case of a failure in a director, the backplane printed circuit board has a pair of buses. One set the disk directors is connected to one bus and another set of the disk directors is connected to the other bus. Likewise, one set the host computer/server directors is connected to one bus and another set of the host computer/server directors is directors connected to the other bus. The cache memories are connected to both buses. Each one of the buses provides data, address and control information.

Figure 1:
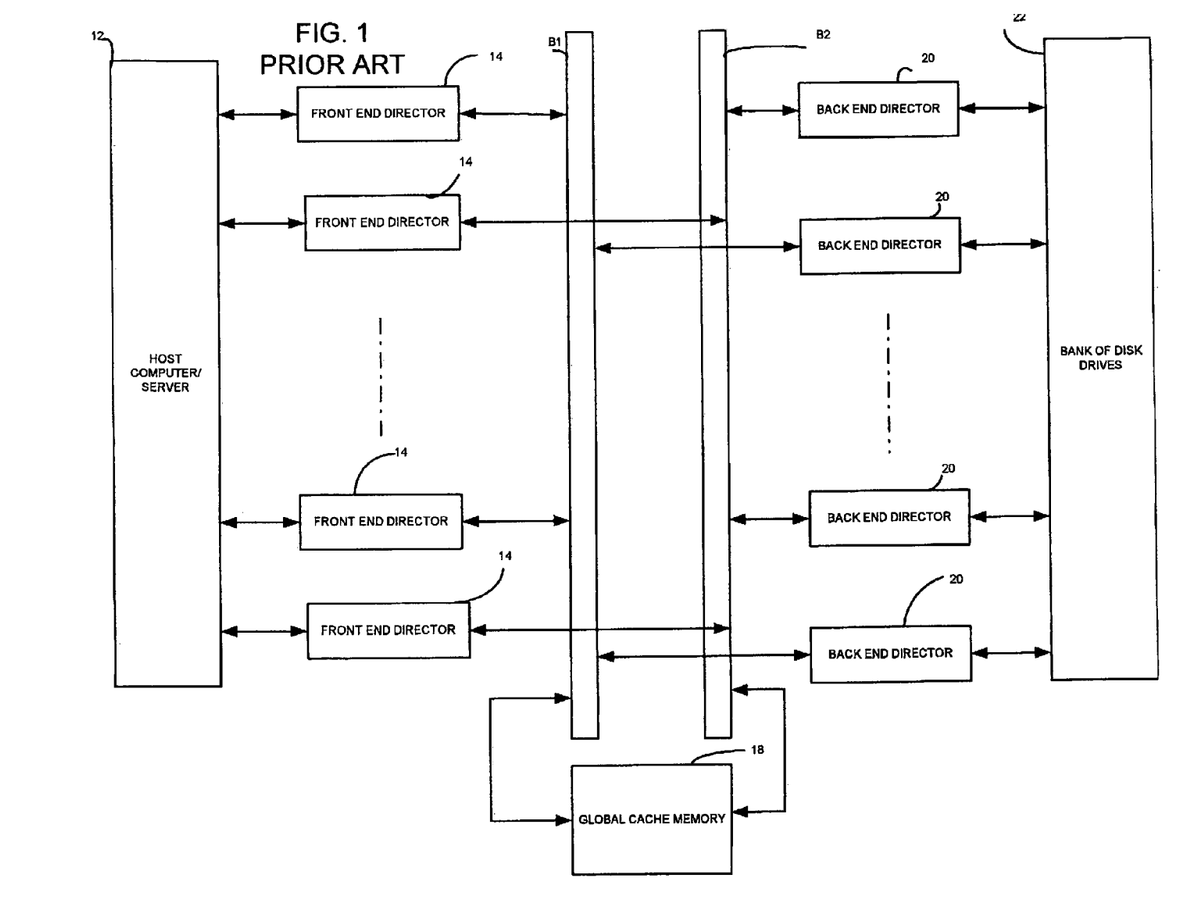
FIG. 1 is a block diagram of a data storage system according to the prior art.

The arrangement is shown schematically in FIG. 1.

Thus, the use of two buses B1, B2 provides a degree of redundancy to protect against a total system failure in the event that the controllers or disk drives connected to one bus, fail. Further, the use of two buses increases the data transfer bandwidth of the system compared to a system having a single bus. Thus, in operation, when the host computer/server 12 wishes to store data, the host computer 12 issues a write request to one of the front-end directors 14 (i.e., host computer/server directors) to perform a write command. One of the front-end directors 14 replies to the request and asks the host computer 12 for the data. After the request has passed to the requesting one of the front-end directors 14, the director 14 determines the size of the data and reserves space in the cache memory 18 to store the request. The front-end director 14 then produces control signals on one of the address memory busses B1, B2 connected to such front-end director 14 to enable the transfer to the cache memory 18. The host computer/server 12 then transfers the data to the front-end director 14. The front-end director 14 then advises the host computer/server 12 that the transfer is complete. The front-end director 14 looks up in a Table, not shown, stored in the cache memory 18 to determine which one of the back-end directors 20 (i.e., disk directors) is to handle this request. The Table maps the host computer/server 12 addresses into an address in the bank 14 of disk drives. The front-end director 14 then puts a notification in a "mail box" (not shown and stored in the cache memory 18) for the back-end director 20, which is to handle the request, the amount of the data and the disk address for the data. Other back-end directors 20 poll the cache memory 18 when they are idle to check their "mail boxes". If the polled "mail box" indicates a transfer is to be made, the back-end director 20 processes the request, addresses the disk drive in the bank 22, reads the data from the cache memory 18 and writes it into the addresses of a disk drive in the bank 22.

When data is to be read from a disk drive in bank 22 to the host computer/server 12 the system operates in a reciprocal manner. More particularly, during a read operation, a read request is instituted by the host computer/server 12 for data at specified memory locations (i.e., a requested data block). One of the front-end directors 14 receives the read request and examines the cache memory 18 to determine whether the requested data block is stored in the cache memory 18. If the requested data block is in the cache memory 18, the requested data block is read from the cache memory 18 and is sent to the host computer/server 12. If the front-end director 14 determines that the requested data block is not in the cache memory 18 (i.e., a so-called "cache miss") and the director 14 writes a note in the cache memory 18 (i.e., the "mail box") that it needs to receive the requested data block. The back-end directors 20 poll the cache memory 18 to determine whether there is an action to be taken (i.e., a read operation of the requested block of data). The one of the back-end directors 20 which poll the cache memory 18 mail box and detects a read operation reads the requested data block and initiates storage of such requested data block stored in the cache memory 18. When the storage is completely written into the cache memory 18, a read complete indication is placed in the "mail box" in the cache memory 18. It is to be noted that the front-end directors 14 are polling the cache memory 18 for read complete indications. When one of the polling front-end directors 14 detects a read complete indication, such front-end director 14 completes the transfer of the requested data which is now stored in the cache memory 18 to the host computer/server 12.

The use of mailboxes and polling requires time to transfer data between the host computer/server 12 and the bank 22 of disk drives thus reducing the operating bandwidth of the interface.

Figure 2:
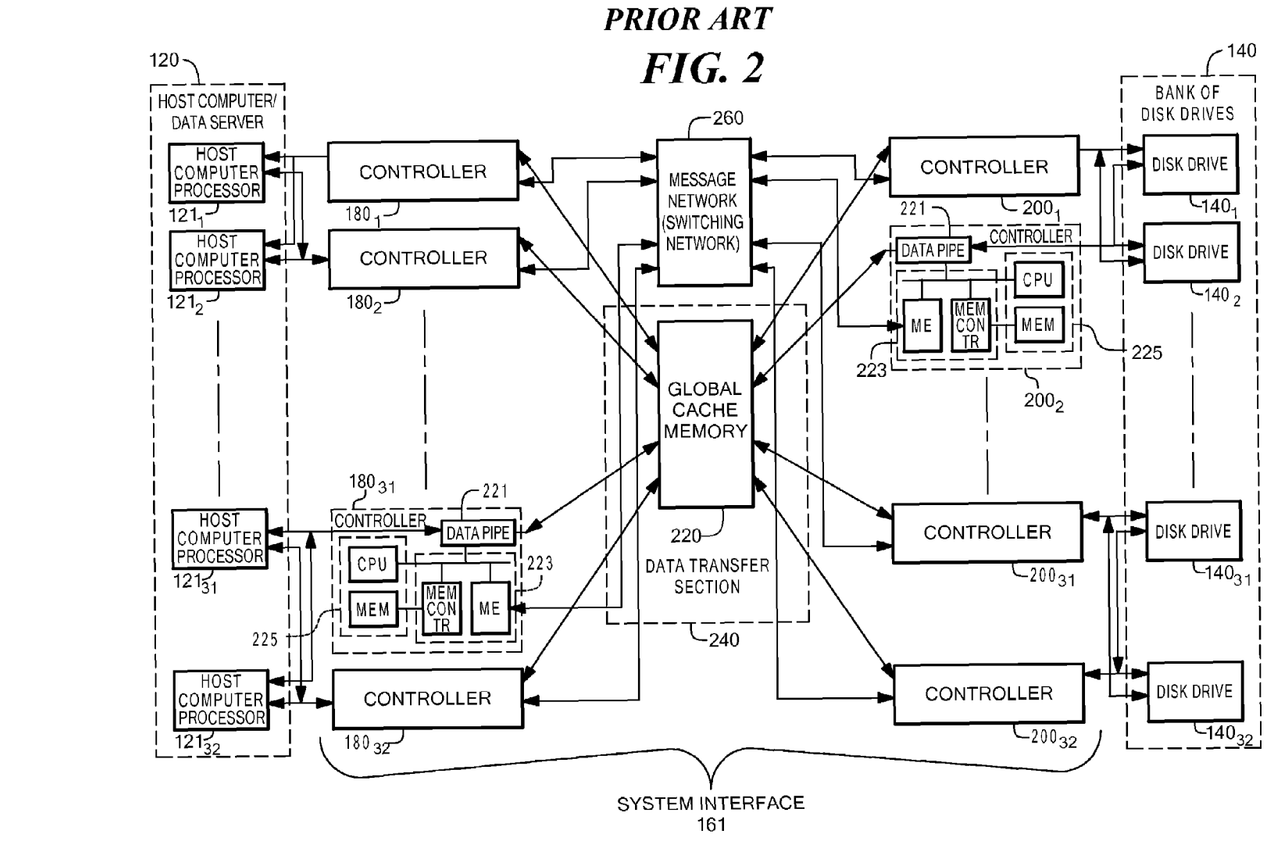
FIG. 2 is a block diagram of a data storage system according to the prior art.

Referring now to FIG. 2, a data storage system 100 is shown for transferring data between a host computer/server 120 and a bank of disk drives 140 through a system interface 161. The data storage system 100 is described in co-pending U.S. Patent application Serial No. US 2000 054828 filed Mar. 31, 2000, the entire subject matter thereof being incorporated herein by reference. Reference is also made to corresponding Great Britain Patent GB 2366425 published Mar. 6, 2002.

The system interface 161 includes: a plurality of, here 32 front-end directors $180_1$–$180_{32}$ coupled to the host computer/server 120 via ports-$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{16}$ and the back-end directors $200_1$–$200_{16}$; and a messaging network 260, operative independently of the data transfer section 240, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar and include a microprocessor (µP) 299 (i.e., a central processing unit (CPU) and RAM), a message engine/CPU controller 314 and a data pipe 316 described in detail in the co-pending patent application. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the messaging network 260. The messages facilitate the data transfer between host computer/server 120 and the bank of disk drives 140 with such data passing through the global cache memory 220 via the data transfer section 240. More particularly, in the case of the front-end directors $180_1$–$180_{32}$, the data passes between the host computer to the global cache memory 220 through a data pipe 221 in the front-end directors $180_1$–$180_{32}$ and the messages pass through the message engine/CPU controller 223 in such front-end directors $180_1$–$180_{32}$. In the case of the back-end directors $200_1$–$200_{32}$ the data passes between the back-end directors $200_1$–$200_{32}$ and the bank of disk drives 140 and the global cache memory 220 through the data pipe 221 in the back-end directors $200_1$–$200_{32}$ and again the messages pass through the message engine/CPU controller 223 in such back-end director $200_1$–$200_{32}$.

With such an arrangement, the cache memory 220 in the data transfer section 240 is not burdened with the task of transferring the director messaging. Rather the messaging network 260 operates independent of the data transfer section 240 thereby increasing the operating bandwidth of the system interface 161.

In operation, and considering first a read request by the host computer/server 120 (i.e., the host computer/server 120 requests data from the bank of disk drives 140), the request is passed from one of a plurality of, here 32, host computer processors $121_1$–$121_{32}$ in the host computer 120 to one or more of the pair of the front-end directors $180_1$–$180_{32}$ connected to such host computer processor $120_1$–$120_{32}$. (It is noted that in the host computer 120, each one of the host computer processors $120_1$–$120_{32}$ is coupled to here a pair (but not limited to a pair) of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $140_1$–$140_{32}$, each disk drive $140_1$–$140_{32}$ being coupled to here a pair (but not limited to a pair) of the back-end directors $200_1$–$200_{32}$, to provide redundancy in the event of a failure in one of the back-end directors $200_1$–$200_{32}$ coupled thereto). Each front-end director $180_1$–$180_{32}$ includes a microprocessor (µP) 225 (i.e., a central processing unit (CPU) and RAM) and described in detail in the above-referenced co-pending patent application. Suffice it to say here, however, that the microprocessor 225 makes a request for the data from the global cache memory 220. The global cache memory 220 has a resident cache management table, not shown. Every director $180_1$–$180_{32}$, $200_1$–$200_{32}$ has access to the resident cache management table and every time a front-end director $180_1$–$180_{32}$ requests a data transfer, the front-end director $180_1$–$180_{32}$ must query the global cache memory 220 to determine whether the requested data is in the global cache memory 220. If the requested data is in the global cache memory 220 (i.e., a read "hit"), the front-end director $180_1$–$180_{32}$, more particularly the microprocessor 225 therein, mediates a DMA (Direct Memory Access) operation for the global cache memory 220 and the requested data is transferred to the requesting host computer processor $120_1$–$120_{32}$.

If, on the other hand, the front-end director $180_1$–$180_{32}$ receiving the data request determines that the requested data is not in the global cache memory 220 (i.e., a "miss") as a result of a query of the cache management table in the global cache memory 220, such front-end director $180_1$–$180_{32}$ concludes that the requested data is in the bank of disk drives 140. Thus the front-end director $180_1$–$180_{32}$ that received the request for the data must make a request for the data from one of the back-end directors $200_1$–$200_{32}$ in order for such back-end director $200_1$–$200_{32}$ to request the data from the bank of disk drives 140. The mapping of which back-end directors $200_1$–$200_{32}$ control which disk drives $140_1$–$140_{32}$ in the bank of disk drives 140 is determined during a power-up initialization phase. The map is stored in the global cache memory 220. Thus, when the front-end director $180_1$–$180_{32}$ makes a request for data from the global cache memory 220 and determines that the requested data is not in the global cache memory 220 (i.e., a "miss"), the front-end director $180_1$–$180_{32}$ is also advised by the map in the global cache memory 220 of the back-end director $200_1$–$200_{32}$ responsible for the requested data in the bank of disk drives 140. The requesting front-end director $180_1$–$180_{32}$ then must make a request for the data in the bank of disk drives 140 from the map designated back-end director $200_1$–$200_{32}$. This request between the front-end director $180_1$–$180_{32}$ and the appropriate one of the back-end directors $200_1$–$200_{32}$ (as determined by the map stored in the global cache memory 200) is by a message which passes from the front-end director $180_1$–$180_{32}$ through the message network 260 to the appropriate back-end director $200_1$–$200_{32}$. It is noted then that the message does not pass through the global cache memory 220 (i.e., does not pass through the data transfer section 240) but rather passes through the separate, independent message network 260. Thus, communication between the directors $180_1$–$180_{32}$, $200_1$–$200_{32}$ is through the message network 260 and not through the global cache memory 220. Consequently, valuable bandwidth for the global cache memory 220 is not used for messaging among the directors $180_1$–$180_{32}$, $200_1$–$200_{32}$.

Thus, on a global cache memory 220 "read miss", the front-end director $180_1$–$180_{32}$ sends a message to the appropriate one of the back-end directors $200_1$–$200_{32}$ through the message network 260 to instruct such back-end director $200_1$–$200_{32}$ to transfer the requested data from the bank of disk drives 140 to the global cache memory 220. When accomplished, the back-end director $200_1$–$200_{32}$ advises the requesting front-end director $180_1$–$180_{32}$ that the transfer is accomplished by a message, which passes from the back-end director $200_1$–$200_{32}$ to the front-end director $180_1$–$180_{32}$ through the message network 260. In response to the acknowledgement signal, the front-end director $180_1$–$180_{32}$ is thereby advised that such front-end director $180_1$–$180_{32}$ can transfer the data from the global cache memory 220 to the requesting host computer processor $121_1$–$121_{32}$ as described above when there is a cache "read hit".

It should be noted that there might be one or more back-end directors $200_1$–$200_{32}$ responsible for the requested data. Thus, if only one back-end director $200_1$–$200_{32}$ is responsible for the requested data, the requesting front-end director $180_1$–$180_{32}$ sends a uni-cast message via the message network 260 to only that specific one of the back-end directors $200_1$–$200_{32}$. On the other hand, if more than one of the back-end directors $200_1$–$200_{32}$ is responsible for the requested data, a multi-cast message (here implemented as a series of uni-cast messages) is sent by the requesting one of the front-end directors $180_1$–$180_{32}$ to all of the back-end directors $200_1$–$200_{32}$ having responsibility for the requested data. In any event, with both a uni-cast or multi-cast message, such message is passed through the message network 260 and not through the data transfer section 240 (i.e., not through the global cache memory 220).

Likewise, it should be noted that while one of the host computer processors $120_1$–$120_{32}$ might request data, the acknowledgement signal may be sent to the requesting host computer processor $120_1$ or one or more other host computer processors $120_1$–$120_{32}$ via a multi-cast (i.e., sequence of uni-cast) messages through the message network 260 to complete the data read operation.

Considering a write operation, the host computer 120 wishes to write data into storage (i.e., into the bank of disk drives 140). One of the front-end directors $180_1$–$180_{32}$ receives the data from the host computer 120 and writes it into the global cache memory 220. The front-end director $180_1$–$180_{32}$ then requests the transfer of such data after some period of time when the back-end director $200_1$–$200_{32}$ determines that the data can be removed from such cache memory 220 and stored in the bank of disk drives 140. Before the transfer to the bank of disk drives 140, the data in the cache memory 220 is tagged with a bit as "fresh data" (i.e., data which has not been transferred to the bank of disk drives 140, that is data which is "write pending"). Thus, if there are multiple write requests for the same memory location in the global cache memory 220 (e.g., a particular bank account) before being transferred to the bank of disk drives 140, the data is overwritten in the cache memory 220 with the most recent data. Each time data is transferred to the global cache memory 220, the front-end director $180_1$–$180_{32}$ controlling the transfer also informs the host computer 120 that the transfer is complete to thereby free-up the host computer 120 for other data transfers.

When it is time to transfer the data in the global cache memory 220 to the bank of disk drives 140, as determined by the back-end director $200_1$–$200_{32}$, the back-end director $200_1$–$200_{32}$ transfers the data from the global cache memory 220 to the bank of disk drives 140 and resets the tag associated with data in the global cache memory 220 (i.e., un-tags the data) to indicate that the data in the global cache memory 220 has been transferred to the bank of disk drives 140. It is noted that the un-tagged data in the global cache memory 220 remains there until overwritten with new data.

Thus, it is noted that with both the systems described above in connection with FIGS. 1 and 2, a single monolithic cache memory is used and all the directors manage contention for such cache memory. It is also noted that the cache memory is uniformly distant from (or close to) all directors

SUMMARY

In accordance with the present invention, the data storage system is configured as multiple independently maintained cache memory structures. More particularly, each one of the directors controls an associated cache memory. Cache memory data coherency is managed in software in the directors, with hardware assists from the directors.

In one embodiment a data storage system is provided for transferring data between a host computer/server and a bank of disk drives through a system interface. The system interface includes a plurality of first director/memory boards, each one thereof having:(i) a director coupled to the host computer/serve; and (ii) a local cache memory section in communication with the director on such board. The interface includes a plurality of second director/memory, each one thereof having: (i) a director coupled to the bank of disk drives; and (ii) a local cache memory section in communication with the director on such board. Write data supplied by the host computer/server to the interface for storage in the bank of disk drives is passed to the local cache memory section of one of the second plurality of director/memory boards and wherein the director on such one of the second plurality of director/memory boards controls the transfer of data from such one of the memory sections to the bank of disk drives. Read data supplied by the bank of disk drives to the interface for use by the host computer/server is passed to the local cache memory section of one of the first plurality of director/memory boards and wherein the director on such one of the first plurality of director/memory boards controls the transfer of data from such one of the memory sections to the host computer/server.

In one embodiment, the local cache memory section is controlled by the director on the one of the broads having both such director and cache memory section.

In one embodiment, the local cache memory sections of the plurality of first director/memory boards and the plurality of second director/memory boards provide a data transfer section for data passing between the host computer/server and the bank of disk drives.

In one embodiment, a network is coupled to the plurality of first directors and the plurality of second directors.

In one embodiment, the first and second directors control data transfer between the host computer and the bank of disk drives in response to messages passing between the first directors and the second directors through the network to control the data transfer between host computer/server and the bank of disk drives with such data passing through the data transfer section.

In one embodiment, the network is a packet switching networks.

In one embodiment, the messages include packets, each one having a destination field.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 3:
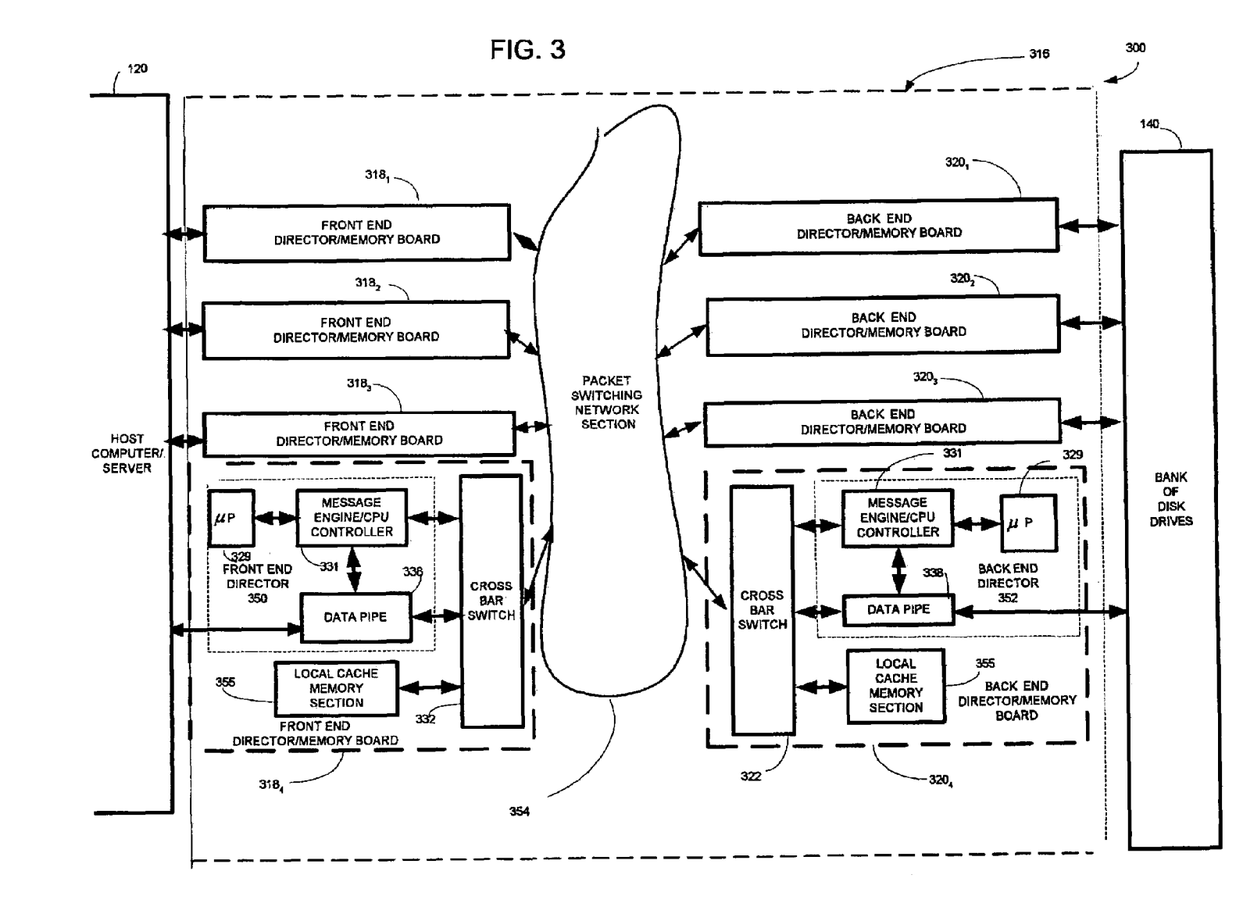
FIG. 3 is a block diagram of a data storage system according to the invention.

Referring now to FIG. 3, a data storage system 300 is configured as multiple independently maintained cache memory structures. More particularly, each one of the directors 350, 352 controls an associated local cache memory section 355. Cache memory data coherency is managed in software in the directors, with hardware assists from the directors. As will be described in more detail below, write data supplied by the host computer/server 120 becomes controlled by (i.e., "owned" by) one of the back end (BE) directors 352 and read data from a disk drive in the bank of disk drives 140 becomes controlled by (i.e., "owned" by) one of the front-end (FE) directors 350.

More particularly, the data system 300 is shown for transferring data between a host computer/server 120 and a bank of disk drives 114 through a system interface 316. The system interface 316 includes: a plurality of, here for example four, front-end director/memory printed circuit boards $318_1$–$318_4$ coupled to the host computer/server 312; a plurality of, here for example, four, back-end director/memory printed circuit boards $320_1$–$320_4$ coupled to the bank of disk drives 314. The front-end director board/memory boards $318_1$–$318_4$ and the back end director/memory boards $320_1$–$320_4$ are coupled together, i.e., communicate with each other, through a packet switching network 354, here a switching fabric, as shown.

The front-end and back-end director/memory boards $318_1$–$318_4$, $320_1$–$320_4$ are functionally similar and include a director; i.e., a FE director 350, or a BE director 352, respectively as the case may be, and a local cache memory 354. Thus, the front-end director/memory boards $318_1$–$318_4$ include front-end (FE) directors 350 and the back-end director/memory boards $320_1$–$320_4$ include back-end (BE) directors 352. It is noted that the FEs 350 are connected to the host computer/server 120 and the BEs 352 are connected to the bank of disk drives 140.

More particularly, each one of the directors 350, 352, whether BE or FE includes a microprocessor (NP) 329 (i.e., a central processing unit (CPU) and RAM), a message engine/CPU controller having a message engine and a memory controller 337; and, a data pipe 338, arranged as shown and described in more detail in co-pending patent application Ser. No. 09/540,828 filed Mar. 31, 2000, inventor Yuval Ofek et al., assigned to the same assignee as the present invention, the entire subject matter thereof being incorporated by reference. Suffice it to say here, however, that the front-end and back-end directors 350, 352 control data transfer between the host computer/server 120 and the bank of disk drives 140 in response to messages passing between the directors 350, 353 through a packet switching network 354, here a switching fabric.

Each message which is created by the microprocessor 329 under software control is stored in a send queue in RAM, not shown. When the message is to be read from the send queue in RAM, not shown, and transmitted through the message network packet switching network 354 to one or more other directors via a DMA operation it is packetized in a packetizer into a packet. For directors, each one of the packets includes the following fields: command; a source ID (i.e., transmitting director); a destination ID (i.e., receiving director) address; a payload; and terminates with a 4-byte Cyclic Redundancy Check (CRC), as shown in FIG. 4A.

Figure 4:
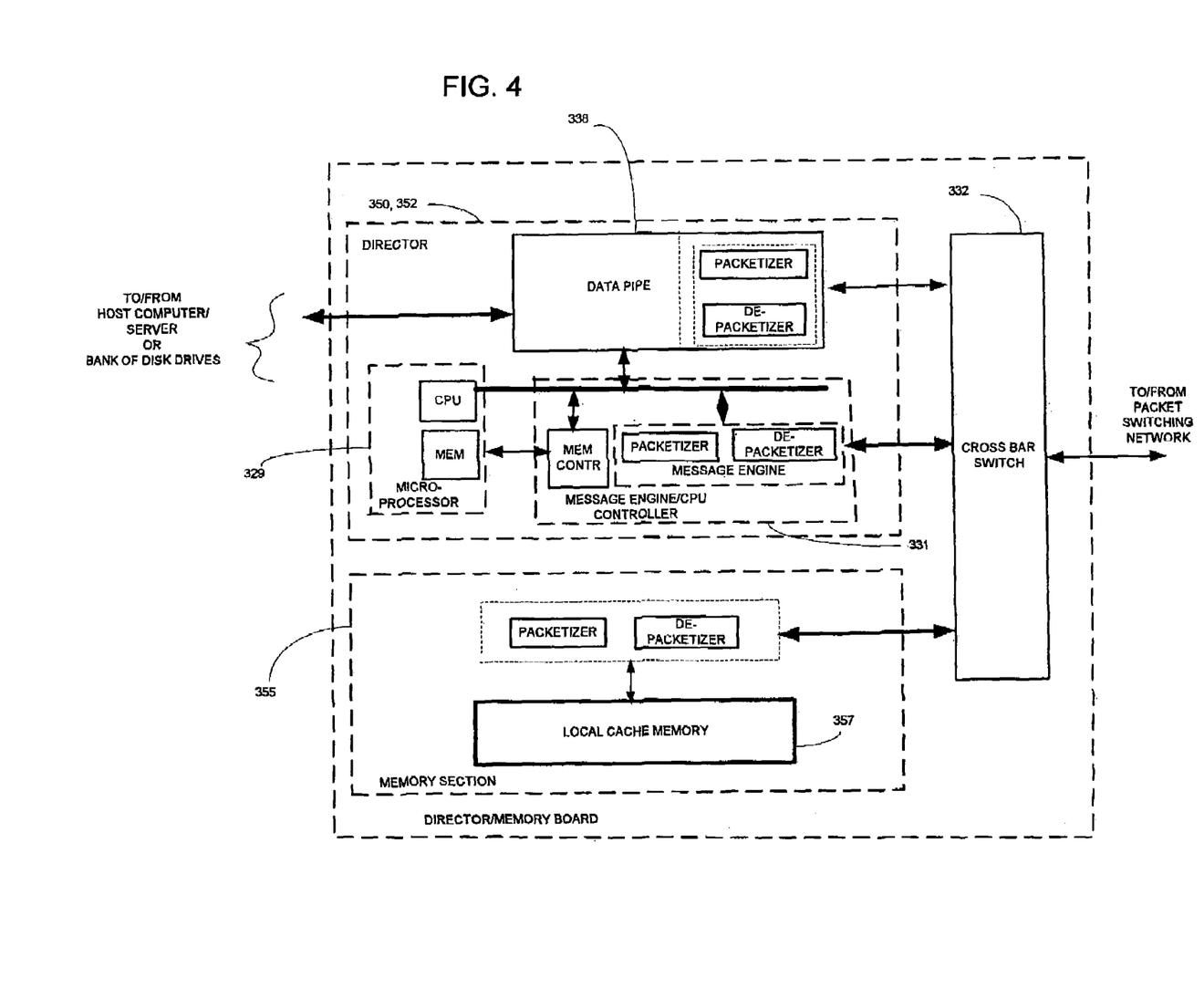
FIG. 4 is a block diagram of an exemplary one of a plurality of director/memory boards used in the data storage system of FIG. 3.
Figure 4A:
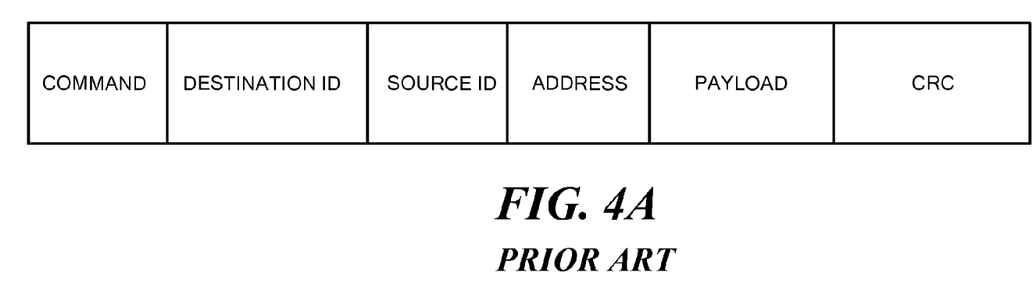
FIG. 4A is a diagram of a packet used in the data storage system of FIG. 2

An exemplary one of the front-end director/memory boards and the back-end director/memory boards is shown in more detail in FIG. 4. As noted above, each one of the boards includes a director 350, 352 as the case may be, and a local memory section 354. The director includes a microprocessor 329, a message engine/CPU controller 331 and a data pipe 338. The data pipe 320 and message engine/CPU controller 331 each includes a packetizer and depacketizer coupled to a cross bar switch 332, as shown. The memory section 335 includes a local cache memory 357 coupled to the cross bar switch 332 through a packetizer and depacketizer, as shown. The cross bar switch is coupled to packet switching network 354, as shown in FIG. 3.

It is noted that because here packet switching is being used, the memory section includes a packetizer and depacketizer to enable a common packet switching protocol to be used for the data pipe, the message engine/CPU controller and the memory section. The data packet passed to and from the memory section.

For data in the cache memory, each one of the packets includes the following fields: command (e.g., read, write); a source ID (i.e., transmitting source) and destination ID (i.e., the director board ID having the control of the data.

It is also noted that the memory section on a director/memory board is able to communicate with the data pipe on the same board via the crossbar switch on such board. Thus, as noted above, the crossbar switches are part of the overall packet switching network section 354. Thus, the front-end and back-end directors 350, 352 and the cache memory sections 355 communicate with one another through the packet switching network as described above, such network including the crossbar switches 332 and the packet switching section 354.

Each packet is sent to the crossbar switch 332. The destination portion of the packet is used to indicate the destination for the message and is decoded by the switch 332 to determine the message routing through the packet switching network section 354. The decoding process uses a routing table, not shown, in the packet switching network section 354, such routing table being initialized by controller during power-up by the initialization and diagnostic processor (controller), not shown. The routing table provides the relationship between the destination address portion of the packet, which identifies the routing for the message and the one of directors 350, 352 to which the message is to be directed.

Here, referring again to FIG. 4, packets use a decoder table, not shown, in the packet switching network 354, such routing table being initialized by controller during power-up by the initialization and diagnostic processor (controller), not shown. The table provides the relationship between the destination address portion of the packet, which identifies the routing for the data and the location in the cache memory for writing or reading the data, as the case may be.

Referring again to FIG. 3, with regard to user data, (i.e., data to be transferred to and from the host computer/server 120) the packet switching network 354 is used to interconnect the directors 350, 352 and the data is transferred through the network 354 in standard "atomic" chunks, or packets. Write data, (i.e., data in the host computer/server 120 to be written into the bank of disk drives 140) is sent to the appropriate back end director (herein sometimes referred to as BE) coupled to the disk drive in bank 140 and into which the data is to be written for de-staging (i.e., transferring from the BE to the disk drive). Read data, (i.e., data on the disk drive in bank 140 to be written into the in the host computer/server 120) is sent to the appropriate front-end director (herein sometimes referred to as FE) coupled to the processor of the host computer/server 120 making the request for such data. The write data is always sent to BE(s) even if it "hits" in the FE controlled cache memory (i.e., the FEs local cache memory section 355.

The front-end directors (FEs) translate different protocols to generic data requests (i.e., the system's protocol). The FEs are basically translators and routers and are required to understand how to route requests (i.e., which one of the BE is to receive the request); but, do not control cache memory coherency. With regard to a read-hit performance, the FEs controls their local cache memory 355. The FEs in effect "own" (i.e., maintain independent control) over their own local cache memory 355 structures, and depend on the BEs to provide data coherency management, service atomic data requests, and provide appropriate acknowledges.

The back end directors (BEs) "own" the drives on their primary attaches (i.e., the primary one of the pair of disk drives in bank 140 they are connected to). The BEs also "own" the system coherency for caching of their drive data in their local cache memories 355. The BEs collectively "own" and manages the system storage map providing the relationship between the directors and which one or ones thereof have the requested data in their local cache memories 355.

The fabric packet switching network 354 supports both messaging communication and user data movement. The network can be a "push-only" model or a "push-pull" model, for example.

Thus, the front-end directors 350 and back end directors 352 all operate independently, and are not constrained to sharing a single global cache memory structure.

The following are examples of cache memory operation.

Figure 5:
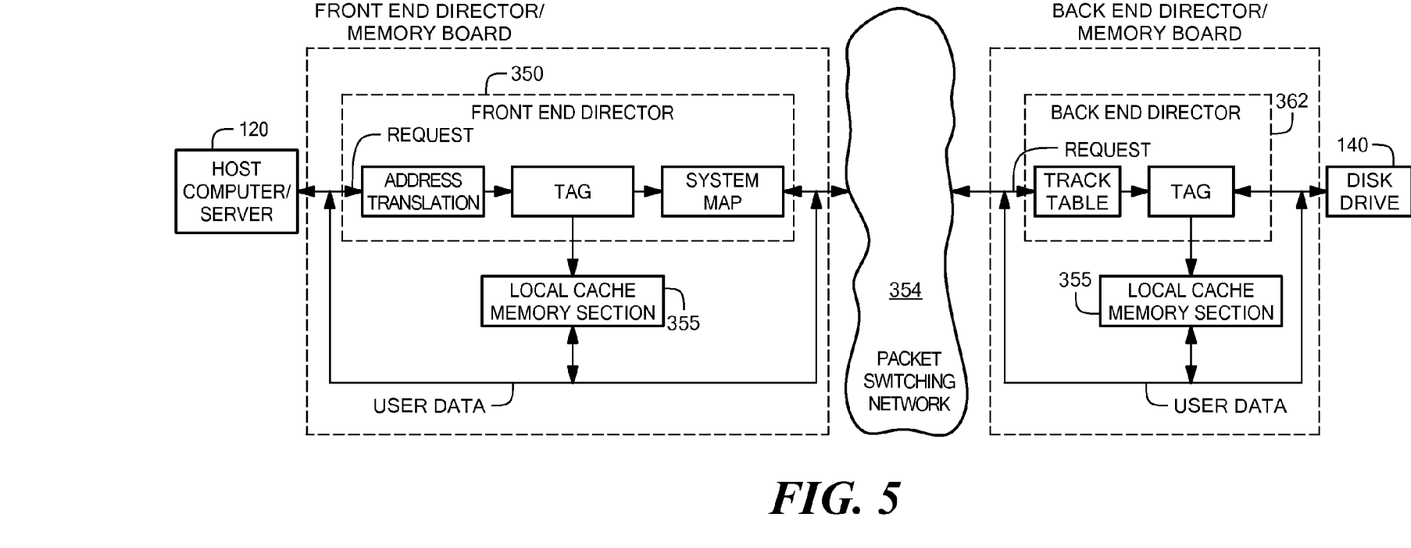
FIG. 5 is a diagram useful in understanding read and write operations of the system of FIG. 3.

Before describing examples of read and write operations, reference is made to FIG. 5. Here, a front end director board is coupled between the host computer/server 120 and the packet switching network 354 and a back end director/memory board is coupled between the packet switching network 354 the bank of disk drives 140. It is noted that on each director board, i.e., front end director board 318₄, for example, or back end director board 320₄, for example, the local cache memory section 355 and the director on such board communicate with each other through the cross bar switch 332 (FIGS. 3 and 4) on such board.

Figure 6A:
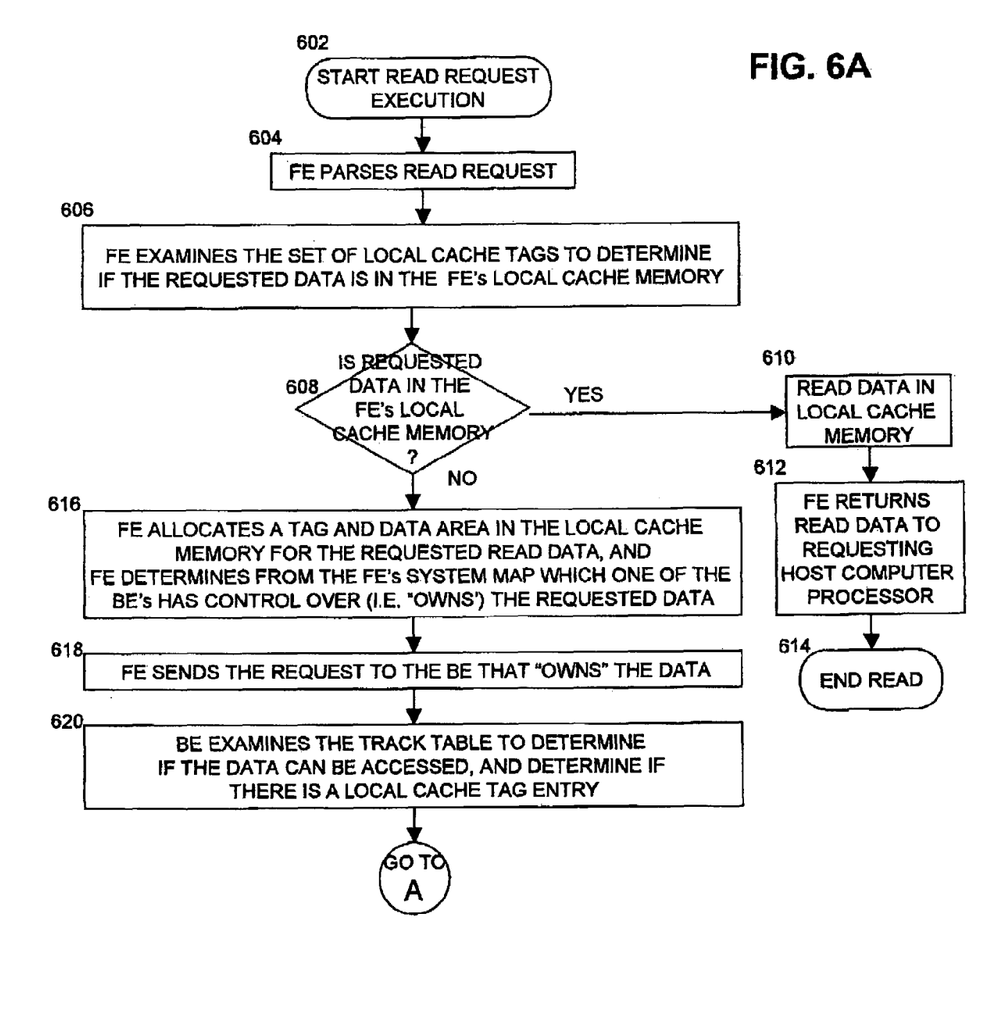
FIGS. 6A and 6B taken together is a flow diagram of a read operation executed by the data storage system of FIG. 3.
Figure 6B:
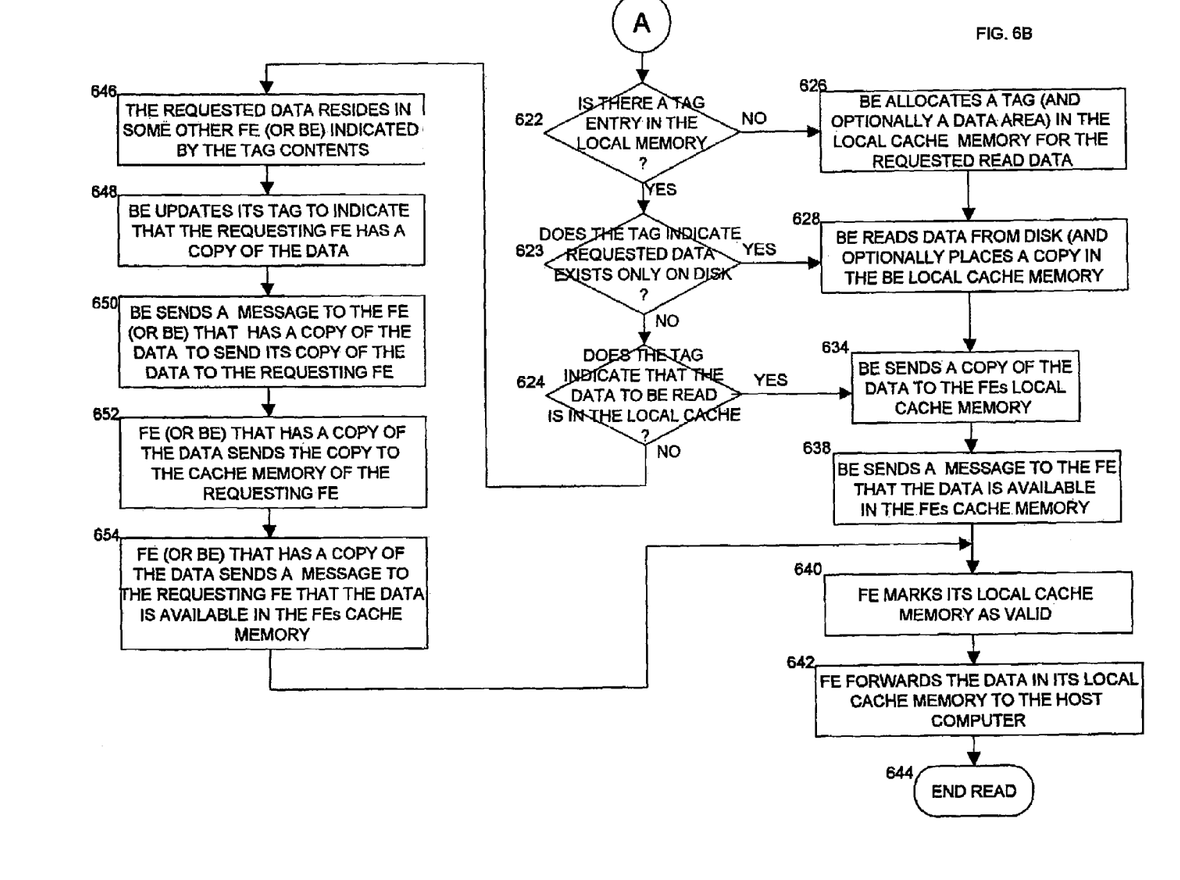

Referring now also to FIGS. 6A and 6B, a read operation will be described.

In Step 602, the read request execution is commenced in response to a read request from the host computer 120. Next, the front end (FE) director 350 receiving the read request from the host computer 120 parses the request, Step 604. Next, the front end FE director 350 then examines the tag (i.e., address of the request) to determine whether the requested data to be read is in the local memory cache 355 of the front end director which received the read request, Step 606. Note that a request from the host computer/server 120 passes to the FE for address translation from the host computer/server address to a system address.

In Step 608, if the front-end director which received the read request determines that the data to be read is in its local cache memory 355, the data in such local cache memory is read therefrom, Step 610. The read data is then returned by the front end director which received the request to the host computer 120 making the requites for such data and the read is competed, Step 614.

On the other hand, if in Step 608 it was determined that the data to be read is not in its local cache memory 355, the front end director receiving the read request determines from the system map thereof (FIG. 5) which one of the back-end directors 362 has control over (i.e., "owns") the requested data. It is noted that the system map points to one and only one BE, which controls the state of the data within the system.

The front-end director receiving the read request also allocates space (i.e., a slot) in its local cache memory 355 for the read data, Step 616.

The front-end director receiving the read request sends a message via the packet switching network 354 to the one of the back-end directors 362 determined to "own" the requested read data, Step 618.

The back-end director which "owns" the requested data examines, in its track table look-up, to verify that the requested data is not currently being actively written to by some other director, and to determine the index within the local cache to access the tag, Step 620.

The back-end director then examines the contents of the tag to determine 30 whether the requested read data exists in this back-end director's local cache memory 355 in some other director's local cache, or in the disk drive coupled to this back-end director. If the requested read data does exist in some other director, the back-end director updates its tag to show a shared copy will reside in the requester's local cache, and forwards a message to the current holder of the data to act on his behalf to provide the data to the requester and send a message to the FE that the data is available in the FEs cache memory. If the director identified as currently holding the requested data returns a message that it no longer has the data (had previously invalidated it's cache line), the back-end director will prepare to access the data from disk, Step 626.

If the requested data exists in this back-end director (i.e., either in this back-end director's local cache memory 355 or in the disk drive coupled to this back-end director), Step 622, the tag processing in this back-end director is used to determine whether the requested data is in that director's local cache memory 355, Step 624. If the requested data is not in that director's local cache memory 355, that back-end director creates a cache line in its local cache memory 355, Step 626. It should be noted that, as an option, the back end does not need to create and store the entire cache line data, it only needs to create a tag indicating in the tag contents that a copy of the data will reside in the requesting front end director's local cache memory 355. That back-end director reads the data from the disk drive and sends it to the local cache memory of the front-end director requesting the data. Step 628. The front end director 350 now having the data in its local cache memory 355, marks its local cache memory entry as valid, stores the read data, and then forwards the read data to the host computer 120, Step 630. The read process then ends Step 632.

On the other hand, if in Step 624, it was determined that the data is in that directors local cache memory 355, that back-end director 352 sends a copy to the local cache memory of the front-end director 350 making the request for the data, Step 634. That back-end director 352 also updates its tag as having a shared copy of the read data, Step 636. That back-end director 352 also sends a message to the front end director making the read data request that the data is available for storage in such front-end director's local cache memory 355, Step 638.

The front-end director making the read data request marks its local cache memory section 355 in its local cache memory as valid. The front end director making the read data request forwards the data in its local cache memory section 355 to the host compute/server 120, Step 642, and the read request ends, Step 644.

If, in Step 622, it is determined that the local cache tag exits and the data is not in the local cache memory section 355, Step 624, and further, the tag indicates that the data exits in some other director, the back end director identifies which other director has the data, Step 646. The back end director will update its tag to indicate that the requesting front end director will have a copy of the data, Step 648. The back end director will then send a request to the identified other director to send it's copy of the data to be read to the requesting director, Step 650. This identified other director will then act on behalf of the back end director in sending the data to be read, Step 652, to the requesting director's local cache memory section 355, and will notify the requesting director that the data is available, Step 652. The front end director will then proceed to send the data to the host computer/server 120, Steps 640, through 644, in the manner described above.

Figure 7:
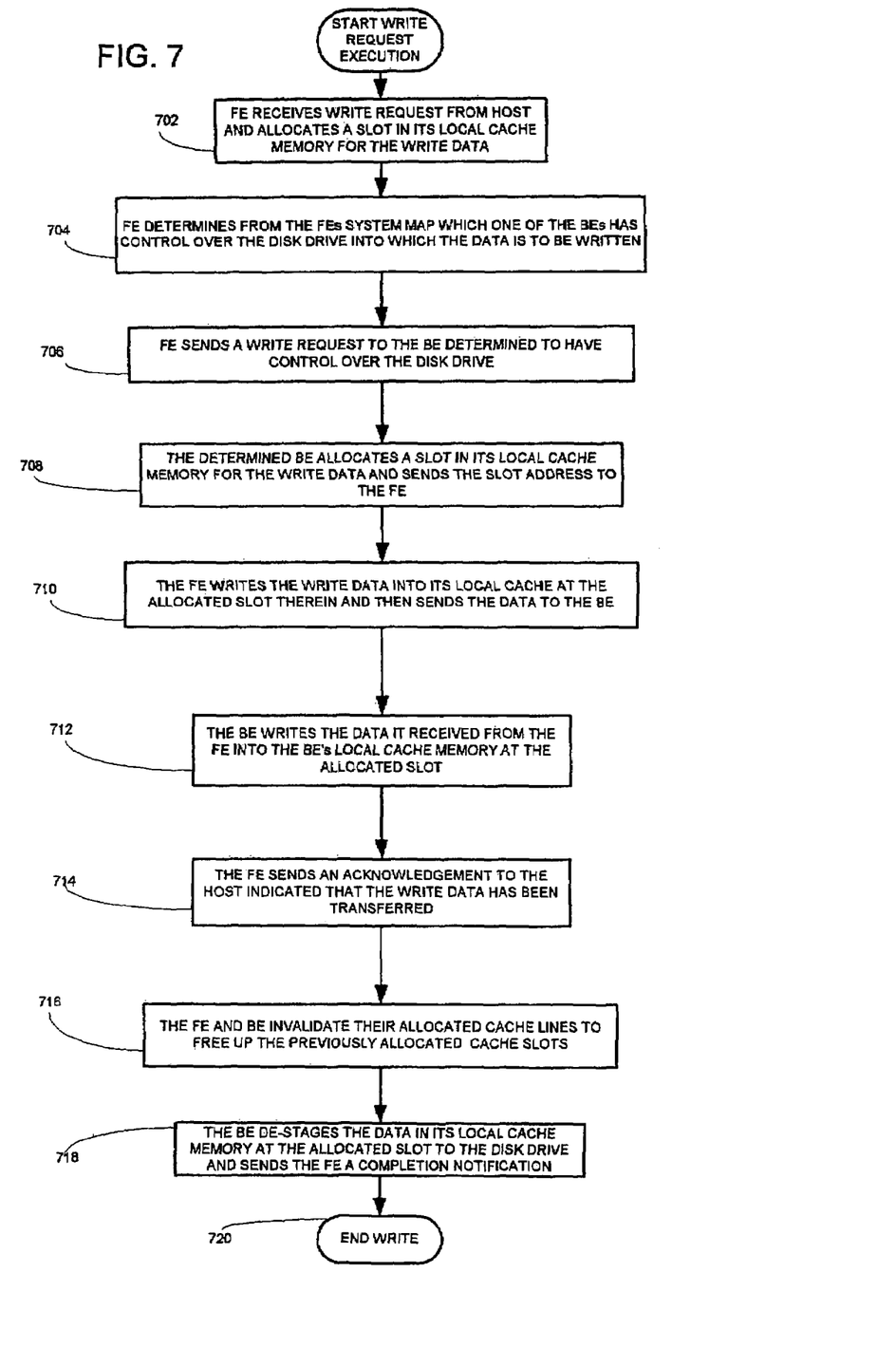
FIG. 7 is a flow diagram of a write operation executed by the data storage system of FIG. 3.

Referring now also to FIG. 7, a write operation will be described.

In Step 702, the write request execution is commenced in response to a write request from the host computer 120 to a front-end director 350. Next, the front end (FE) director 350 receiving the write request from the host computer 120 parses the request and allocates a slot in its local cache memory 355 for the write data, Step 704.

The front end director receiving the write request determines from its system map (FIG. 5) which one of the back end directors has control over the disk Step 404. Note that a request from the host computer/server 120 passes to the front-end director receiving the request for address translation from the host computer/server address to a system address.

In Step 706, the front end director receiving the request sends the request to the back end director determined to have control of the disk drive into which the data from the host computer is to be written.

The back-end director which "owns" the requested data examines in its track table to verify that the requested data is not currently being actively written to by some other director, and to determine the index within the local cache to access the tag. It also determines from the tag if there are shared read copies in other director's local caches, and if so issues cache line invalidate requests to those directors.

In Step 708, the back end director determined to have control of the disk drive into which the data from the host computer is to be written allocates a slot in its local cache memory 355 for the write data if one does not already exist, and sends the slot address to the front end director receiving the request from the host computer to write the data.

In Step 710, the front end director 350 writes the from the host computer 120 into its local cache memory 355 at the allocated slot therein and then sends the same data to the back-end director determined to have control of the disk drive into which the data from the host computer is to be written.

In Step 712, the back end director 352 determined to have control of the disk drive into which the data from the host computer will be placed writes the data it received from the front end director into that back end directors local cache memory 355 at the allocated slot. Thus, there are two copies of the data to be written into the disk drive; one in the local cache of the front end director receiving the write request and one of the back end director coupled to the disk drive into which such data is to be written.

In Step 714, the front-end director which received the write request sends an acknowledgement to the host computer 120 that the write data has been transferred.

In Step 716, the back-end director coupled to the disk drive into which such data is to be written de-stages the data in the allocated slot of its local cache memory 355 to the disk drive and sends the front end director which received the request from the host computer a write completion notification.

In Step 718, the front end and back end directors 350, 352 invalidate their allocated cache lines in order to free up the previously allocated cache slots.

The write operation is completed, Step 720.

A number of embodiments of the invention have been described. Nevertheless, it will be understood that various modifications may be made without departing from the spirit and scope of the invention. Accordingly, other embodiments are within the scope of the following claims.

What is claimed is:

1. A method for transferring data between a host computer/server and a bank of disk drives through a system interface, such system interface having: (A) plurality of first director/memory boards, each one thereof having: (i) a director coupled to the host computer/serve; and (ii) a local cache memory section in communication with the director on such board; and (B) a plurality of second director/memory, each one thereof having:(i) a director coupled to the bank of disk drives; and (ii) a local cache memory section in communication with the director on such board, such method comprising:

(a) passing write data supplied by the host computer/server to the interface for storage in the bank of disk drives to the local cache memory section of one of the second plurality of director/memory boards;

(b) having the director on such one of the second plurality of director/memory boards control the transfer of data from such one of the memory sections to the bank of disk drives;

(c) passing read data supplied by the bank of disk drives to the interface for use by the host computer/server to the local cache memory section of one of the first plurality of director/memory boards; and (d) having the director on such one of the first plurality of director/memory boards controls the transfer of data from such one of the memory sections to the host computer/server; and wherein:

during a read request executed in response to a read request from the host computer/server, a read request receiving director on one of the plurality of first director/memory boards receives the read request from the host computer/server, examines a tag providing an address of the request to determine whether the requested data to be read is in the local cache memory on said one of the plurality of first director/memory boards having the read request receiving director; and if it is determined that the data to be read is not in the local cache memory on said one of the plurality of first director/memory boards having the read request receiving director, the read request receiving director:

allocates a slot in the local cache memory on said one of the plurality of first director/memory boards having the read request receiving director and determines from a system map which one of a data controlling director one of the directors in the plurality of second director/memory boards has control over the requested data;

sends a message to the data controlling director and such data controlling director examines a track table look-up therein to verify that the requested data is not currently being actively written to by some other one of the directors, and to determine an index within the local cache memory of the one of the plurality of second director/memory boards having thereon the data controlling director to access the tag; and wherein:

the data controlling one of the director examines the contents of the tag to determine whether the requested read data exists in the local cache memory on the board having this data controlling director or in some other local memory cache, or in the disk drive coupled to this data controlling director; and if the requested read data does exist in the local cache memory on the board having this data controlling director, or in the disk drive coupled to this director; the data controlling director sends a copy of the read data to the local cache memory of the read request receiving director; updates the data controlling the director's tag to show a copy of the read data will reside in the read request receiving director's local cache; and also send a message to the read requesting director indicating the read data is available in the local memory cache on said one of the plurality of first director/memory boards having the read request receiving director.

2. The method recited in claim 1 wherein including having the local cache memory section controlled by the director on the one of the boards having both such director and cache memory section.

3. A method for transferring data between a host computer/server and a bank of disk drives through a system interface, such system interface having: (A) plurality of first director/memory boards, each one thereof having: (i) a director coupled to the host computer/serve; and (ii) a local cache memory section in communication with the director on such board; and (B) a plurality of second director/memory, each one thereof having:(i) a director coupled to the bank of disk drives; and (ii) a local cache memory section in communication with the director on such board; (C) wherein the local cache memory sections of the plurality of first director/memory boards and the plurality of second director/memory boards provide a data transfer section for data passing between the host computer/server and the bank of disk drives; (D) a network coupled to the plurality of first directors and the plurality of second directors, and (E) wherein the first and second directors control data transfer between the host computer and the bank of disk drives in response to messages passing between the first directors and the second directors through the network to control the data transfer between host computer/server and the bank of disk drives with such data passing through the data transfer section; such method comprising:

(a) passing write data supplied by the host computer/server to the interface for storage in the bank of disk drives to the local cache memory section of one of the second plurality of director/memory boards;

(b) having the director on such one of the second plurality of director/memory boards control the transfer of data from such one of the memory sections to the bank of disk drives;

(c) passing read data supplied by the bank of disk drives to the interface for use by the host computer/server to the local cache memory section of one of the first plurality of director/memory boards; and (d) having the director on such one of the first plurality of director/memory boards controls the transfer of data from such one of the memory sections to the host computer/server and wherein:

during a read request executed in response to a read request from the host computer/server, a read request receiving director on one of the plurality of first director/memory boards receives the read request from the host computer/server, examines a tag providing an address of the request to determine whether the requested data to be read is in the local cache memory on said one of the plurality of first director/memory boards having the read request receiving director; and if it is determined that the data to be read is not in the local cache memory on said one of the plurality of first director/memory boards having the read request receiving director, the read request receiving director:

allocates a slot in the local cache memory on said one of the plurality of first director/memory boards having the read request receiving director and determines from a system map which one of a data controlling director one of the directors in the plurality of second director/memory boards has control over the requested data;

sends a message to the data controlling director and such data controlling director examines a track table look-up therein to verify that the requested data is not currently being actively written to by some other one of the directors, and to determine an index within the local cache memory of the one of the plurality of second director/memory boards having thereon the data controlling director to access the tag; and wherein:

the data controlling one of the director examines the contents of the tag to determine whether the requested read data exists in the local cache memory on the board having this data controlling director or in some other local memory cache, or in the disk drive coupled to this data controlling director; and if the requested read data does exist in the local cache memory on the board having this data controlling director, or in the disk drive coupled to this director; the data controlling director sends a copy of the read data to the local cache memory of the read request receiving director; updates the data controlling the director's tag to show a copy of the read data will reside in the read request receiving director's local cache; and also send a message to the read requesting director indicating the read data is available in the local memory cache on said one of the plurality of first director/memory boards having the read request receiving director.

4. The method recited in claim 3 wherein including having the local cache memory section controlled by the director on the one of the boards having both such director and cache memory section.

5. The method recited in claim 4 wherein the network is a packet switching networks and wherein the messages include packets, each one having a destination field.

* * * * *